United States Patent Office 3,081,319
Patented Mar. 12, 1963

3,081,319
PROCESS AND INTERMEDIATES FOR PREPARING
6α-FLUORO-21-METHYL COMPOUNDS
Hans-Jurgen E. Hess, Groton, Sanford K. Figdor and George M. K. Hughes, Gales Ferry, and Walter T. Moreland, New London, Conn., assignors to Chas. Pfizer & Co., Inc., New York, N.Y., a corporation of Delaware
No Drawing. Filed May 11, 1960, Ser. No. 28,186
8 Claims. (Cl. 260—397.47)

This application is concerned with a new and useful method for the preparation of the valuable new compound 6α-fluoro-21-methyl-$\Delta^4$-pregnene-17α,21-diol,3,20-dione and the corresponding desfluoro compound. These compounds are especially useful since they serve as starting compounds for the preparation of a valuable new class of adrenocortically active steroids described and claimed in copending patent application, Serial No. 3,996, filed January 22, 1960. The application also concerns itself with valuable intermediates prepared by the process of the invention.

The compounds prepared by the process of this invention are represented by the formula:

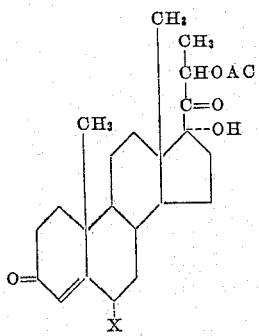

wherein X is selected from the group consisting of hydrogen and fluorine; and AC is an acyl hydrocarbon group containing only carbon, hydrogen and oxygen up to a total of five carbon atoms.

The following synthetic sequence illustrates the highly selective method by which these valuable compounds are prepared.

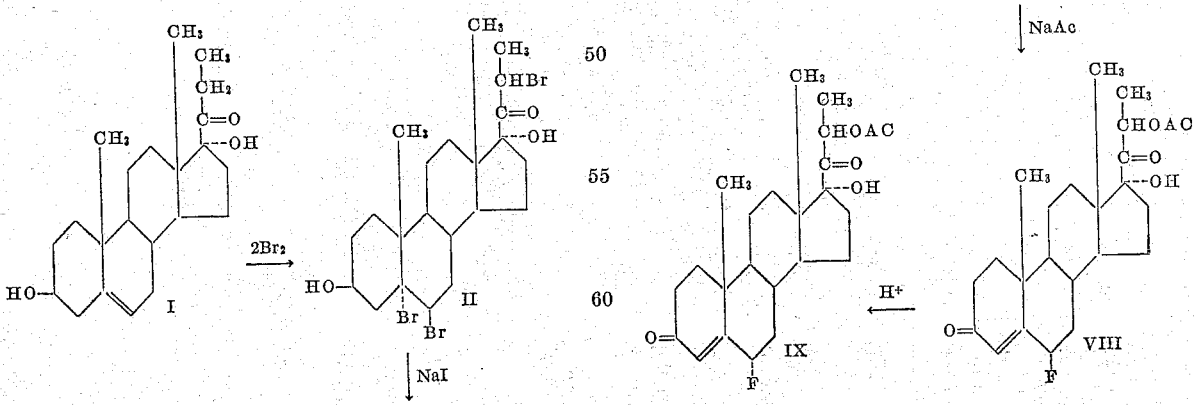

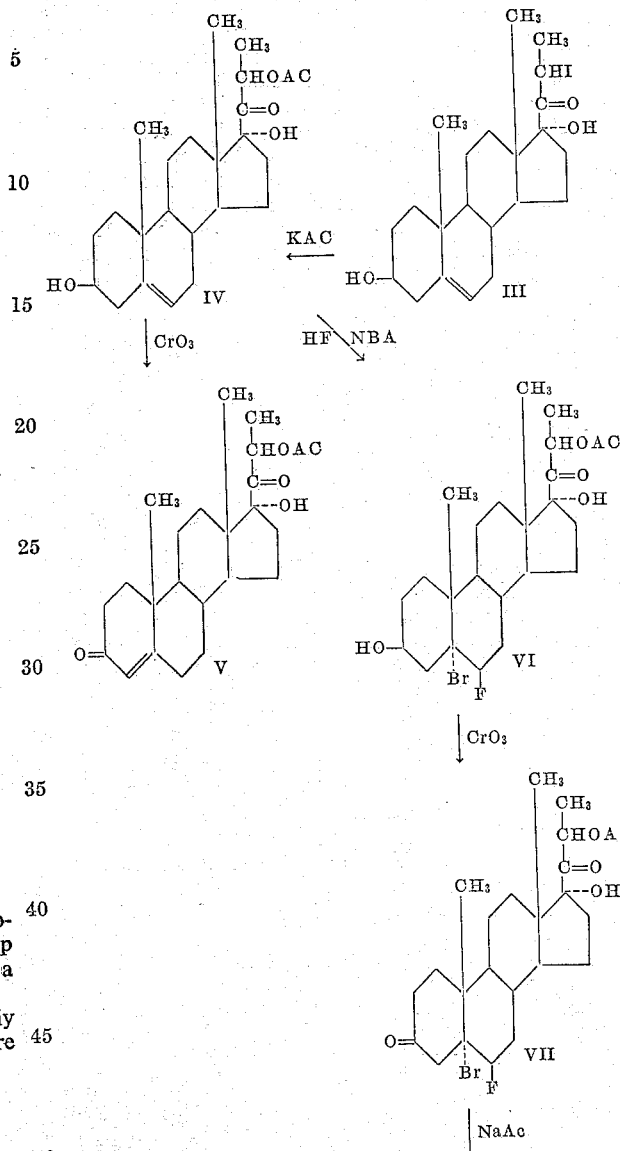

Compounds V and IX will be recognized as those with which this application is directly concerned. Compounds II, III, IV, VI, VII and VIII are new and valuable and are specifically included within the purview of this invention.

Compound I is described in copending and concurrently filed patent application, Serial No. 28,185, now U.S. Patent 3,047,594, which also describes its preparation. It is prepared from the known compound $\Delta^4$-pregnene-3$\beta$,17$\alpha$-diol-20-one by reaction with formaldehyde and dimethylamine acid addition salt to produce 21-dimethylaminoethyl-$\Delta^5$-pregnene-3$\beta$,17$\alpha$-diol-20-one which is in turn converted to a quaternary alkyl halide such as 21-dimethylaminomethyl - $\Delta^5$-pregnene - 3$\beta$,17$\alpha$ - diol-20-one methobromide. Treatment of this latter compound in aqueous solution at a pH of from about 7 to about 12 at a temperature of from about 20° C. to about 30° C. for a period of from about 1 to about 6 hours converts it to 21-methylene-$\Delta^5$-pregnene-3$\beta$,17$\alpha$-diol-20-one, and this compound is hydrogenated in the presence of a palladium catalyst in a suitable solvent including, for example, lower aliphatic oxygenated solvents such as methanol, ethanol, acetone or ethyl acetate at a temperature of from about 15° C. to about 35° C. at from about 1 to about 10 atmospheres until the theoretical amount of hydrogen has been taken up.

In the first step of this synthetic method, the compound 21-methyl-$\Delta^5$-pregnene-3$\beta$,17$\alpha$-diol - 20-one is converted to 5$\alpha$,6$\beta$,21-tribromo - 21-methyl-pregnane-5$\beta$,17$\alpha$-diol-20-one by reaction with at least two molar equivalents of bromine. The reaction is effected by treating the steroid compound with from about two to about two and one-half molar equivalents of bromine at a temperature of from about 0° C. to about 40° C., preferably 20° C. to 30° C. for a period of from about one-half to about four hours.

Suitable solvents include hydrocarbon and halogenated hydrocarbon solvents containing up to seven carbon atoms and acetic acid. Methylene chloride, ethylene chloride, chloroform, carbon tetrachloride, benzene, toluene, and chlorobenzene may be mentioned by way of example. Mixtures of solvents can also be employed.

In a preferred method, the steroid is taken up in the selected solvent and 2 molar equivalents of bromine solution comprising bromine dissolved in the same solvent is added while maintaining the temperature at from about 20° C. to about 30° C. The mixture is then allowed to stand at this same temperature until most of the bromine color has disappeared. This usually takes from about two to about four hours.

The product may be isolated by any of a number of means known to those skilled in the art. In one especially suitable method, a slight vacuum is first applied to the mixture to remove most of the hydrogen bromide which forms in the reaction. The solution is then washed with an alkaline reagent and with water. Suitable alkaline reagents include, for example, 5% aqueous sodium carbonate, bicarbonate hydroxide or equivalent potassium salts. The organic layer is then dried over an anhydrous drying agent such as sodium or magnesium sulfate, filtered and the solvent removed in vacuo to leave the desired product as a residue.

In the next step of this procedure, the tribromo compound is converted to 21-iodo-$\Delta^5$-pregnene-3$\beta$,17$\alpha$-diol-20-one. The reaction is carried out by reaction of the steroid with from about four to about seven molar equivalents of sodium iodide in a lower aliphatic ketone solvent containing up to five carbon atoms. Acetone and other ketones which are at least 30% soluble in water are preferred since the product may then be isolated simply by pouring the reaction mixture into water. With water immiscible solvents, the product is isolated by distilling off the solvent. The residue is then washed with water to remove excess inorganic reagent.

The temperature of the reaction is from about 20° C. to about 40° C., preferably about 25° C. to about 30° C. The duration of the reaction is from about 15 to about 30 hours.

The iodo compound is next converted to an acyloxy compound by replacement of the iodine atom with an acyloxy group containing up to five carbon atoms. Basically, this is a reaction with a sodium or potassium salt of an organic acid, and it may be carried out either by direct addition of the sodium or potassium salt to a solution of the iodo steroid or by in situ formation of the salt in the solution containing the steroid. In either event, the reaction is between the iodo steroid and the salt, for example, sodium or potassium acetate, propionate, butyrate or valerate, and takes place in dimethyl formamide or a lower aliphatic oxygenated solvent containing up to five carbon atoms including esters such as ethyl acetate or ketones such as acetone and methyl isopropyl ketone. The reaction takes place at a temperature of from about 40° C. to about 100° C. during a period of from about four to about twenty-four hours. An excess of salt is generally employed to insure complete reaction of the steroid. Thus, a quantity of the salt ranging from about 200% to about 2000% or even more is used, with from about 1000% to about 2000% being preferred.

In a preferred operation, the salt is generated in situ by adding the steroid in acetone to an acetone solution containing equimolar portions of potassium bicarbonate and acetic acid or other selected acid and refluxing the mixture for from about 10 to about 16 hours. A sufficient quantity of acid and salt should be used to generate the desired excess of the potassium salt.

Whichever procedure is used, the product may be isolated by removing the solvent in vacuo and washing the residue with a minimum amount of water to remove the inorganic salts. Alternatively, the reaction mixture may be diluted with water and recovered by filtration or the resulting solution extracted with an organic solvent. Suitable solvents include lower hydrocarbon and halogenated hydrocarbon solvents containing up to seven carbon atoms, including, for example, benzene, toluene, chlorobenzene, methylene chloride or chloroform. The product is isolated from the organic solution preferably by removal of the solvent in vacuo. It is desirable although not necessary to dry the organic solution over an anhydrous drying agent such as sodium or magnesium sulfate before evaporating the solvent.

It will be recognized that two epimeric forms of this compound exist. Both are prepared and can be separated by recrystallization.

The exact procedure used for the balance of this valuable synthetic method depends upon whether it is desired to prepare a 6$\alpha$-fluoro steroid or a 6-desfluoro steroid. In the former case, the $\Delta^5$-compound is treated with hydrogen fluoride and N-bromoacetamide to produce a 5$\alpha$-bromo-6$\beta$-fluoro steroid. The hydroxyl group at the 3-position is oxidized to a 3-keto group and the bromine atom is removed by reaction with sodium acetate or similar reagent. Inversion of the 6$\beta$-fluorine atom produces the desired 6$\alpha$-fluoro compound.

In the case where a desfluoro compound is desired, the 21-methyl-$\Delta^5$-pregnene-3$\beta$,17$\alpha$,21-triol-20-one. 21-acetate is oxidized to form 21-methyl-$\Delta^4$-pregnene-17$\alpha$,21-diol-3,20-dione 21-ester.

If a 6-fluoro compound is to be prepared, the 21-methyl-$\Delta^5$-pregnene-3$\beta$,17$\alpha$,21-triol-20-one 21-acetate is converted to 5$\alpha$ - bromo - 6$\beta$-fluoro-21-methyl-pregnane-3$\beta$,17$\alpha$,21-triol-20-one 21-acetate. This is accomplished by reaction with N-bromoacetamide in the presence of anhydrous hydrogen fluoride. The reaction is carried out in a solvent system consisting of tetrahydrofuran and methylene chloride containing from about 20% to about 40% tetrahydrofuran by volume. Other solvents or solvent systems, for example, dioxane and chloroform can be used, but it is preferred to use the tetrahydrofuran-methylene chloride system since reaction in this system affords crystalline products of relatively high purity.

From about 1.05 to about 1.5 molar equivalents of N-bromoacetamide are employed, preferably, from about 1.05 to about 1.15. An excess of from about 25 to about 100 molar equivalents anhydrous hydrogen fluoride, preferably, from about 45 to about 55 molar equivalents is used.

The reaction is carried out at a temperature of from about −80° C. to about −50° C., preferably, from about −80° C. to about −70° C. for a period of from about one to about sixteen hours, preferably, from about one to about two hours.

The product is isolated at the end of the reaction period by cautiously pouring the reaction mixture into an aqueous solution of potassium carbonate or bicarbonate containing sufficient alkaline reagent to neutralize substantially all of the acid present. The use of a sodium base is best avoided because the sodium fluoride which forms is of low solubility in water and its precipitation increases the mechanical difficulty of working with the mixture. The organic layer is separated and the aqueous layer, preferably, extracted with additional quantities of the methylene chloride or other water insoluble solvent used for the reaction. It is then washed with dilute aqueous alkaline reagent until neutral and finally with water. The desired compound is isolated from the organic layer, preferably, after drying over an anhydrous drying agent, such as anhydrous sodium sulphate, by evaporation of the solvent in vacuo.

The hydroxyl group at the 3-position is next oxidized to form a 3-keto compound. The choice of oxidizing agent is not critical, although it is preferred to use chromic acid in accordance with standard procedures. One procedure which is especially effective is to use 8 N chromic acid prepared by dissolving 66.7 g. of chromic acid in a minimum of water and adding 55.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be used.

This oxidation procedure is similarly applicable to the preparation of 21-methyl-Δ⁴-pregnene-17α,21-diol-3,20-dione 21-acetate, that is, Compound V above.

For the preparation of a 6-fluoro compound, the 5α-bromo - 6β - fluoro-21-methyl-pregnane-17α,21-diol-3,20-dione 21-acetate prepared as described above is converted to 6β-fluoro-21-methyl-Δ⁴-pregnene-17α,21-diol-3,20-dione 21-acetate by removal of the 5α-bromine atom. This is accomplished by heating the steroid compound in a reaction inert lower aliphatic oxygenated organic solvent containing up to eight carbon atoms in the presence of an alkaline reagent, preferably, a salt such as, for example, sodium acetate, sodium propionate, potassium acetate, sodium carbonate or potassium bicarbonate which hydrolyzes to give a mildly alkaline solution. Other bases such as sodium or potassium hydroxide can be used, but there is some tendency towards degradative side reactions when these reagents are employed. Suitable solvents include, for example, methanol, ethanol, propanol, ethyl acetate, methyl propionate, methyl isopropyl ketone or di-n-butyl ketone.

At least a molar equivalent of alkaline reagent, and preferably a molar excess of from about 30% to about 200% should be used.

The temperature range for obtaining optimum yields is from about 50° C. to about 130° C. The duration of the reaction is from about one-half to about four hours. It is preferred to carry the reaction out at a temperature range of from about 50° C. to about 75° C. for a period of from about one-half hour to about one hour. It is convenient to select a solvent with a boiling point under atmospheric conditions with the temperature range and to reflux the reaction mixture for the selected period of time.

Refluxing the steroid in methanol in the presence of sodium acetate for a period of about forty minutes provides very good yields.

The product is isolated in accordance with standard means known in the art. For example, it can be precipitated by the addition of water if the reaction solvent is water miscible. Alternatively, with a water immiscible solvent, the solvent may be evaporated in vacuo and the product purified by washing the residue with water. Further, purification may be affected by recrystallization from isopropanol or other suitable solvent or by trituration with ethyl acetate.

The 6β-fluorine atom is next isomerized to form 6α-fluoro - 21 - methyl - Δ⁴ - pregnene - 17α,21 - diol - 3,20-dione 21-acetate. This is accomplished by treatment of the 6β-epimer with a prototropic agent such as water, alcohols, organic acids and mineral acids. Of these, mineral acids such as hydrochloric, hydrobromic, sulfuric and phosphoric are preferred. The reaction is carried out at from about −5° C. to about 10° C. for from about 2 to about 4 hours. In preferred operations, reaction is effected at from about 0° C. to about 10° C. for from about 2½ hours to about 3 hours. Suitable solvents for carrying out the reaction include halogenated hydrocarbons containing up to two carbon atoms and aliphatic acids as alkanols containing up to three carbon atoms or mixtures of these solvents. There may be mentioned by way of example, methanol, ethanol, propanol, carbon tetrachloride, methylene chloride and chloroform. In a preferred embodiment of the process, the 6β-epimer, dissolved in chloroform and absolute methanol is treated with anhydrous hydrogen chloride for about 3 hours at 0° C. to 10° C. At the end of this period, the reaction mixture is diluted with chloroform, washed successively with sodium bicarbonate and water, dried and evaporated to dryness in vacuo. The product is obtained as a residue and may be purified by recrystallization using, for example, a mixture of isopropanol and methylene chloride.

The amount of isomerizing agent used in converting the 6β-epimer to the 6α-epimer is not critical. Theoretically, extremely small amounts of reagent are capable of effecting the desired result. In preferred operations, an anhydrous hydrogen halide, suitable hydrogen chloride or hydrogen bromide, is bubbled through the mixture until substantially all of the fluorine has been epimerized. However, other prototropic agents can be used, either organic or inorganic in aqueous or anhydrous form. As much as 50% by volume or even more of acid can be used to effect the desired result.

Although the procedures described above relate specifically to 21-acetates, it should be understood that similar procedures are applicable to the preparation of the other esters of this invention, namely, formates, propionates, butyrates and valerates.

Compounds prepared by the process of this invention are useful since they can be converted by known reactions to certain of the adrenocortically active steroids described and claimed in the aforesaid copending patent application. The following reaction sequence shows the conversion of 6α - fluoro - 21 - methyl - Δ⁴ - pregnene - 17α,21 - diol-3,20-dione 21-acetate to the compound 6α,9α-difluoro-21-methyl - Δ¹,⁴-pregnadiene-11β,17α-diol-3,20-dione 21-acetate, a representative of this class of adrenocortically active steroids.

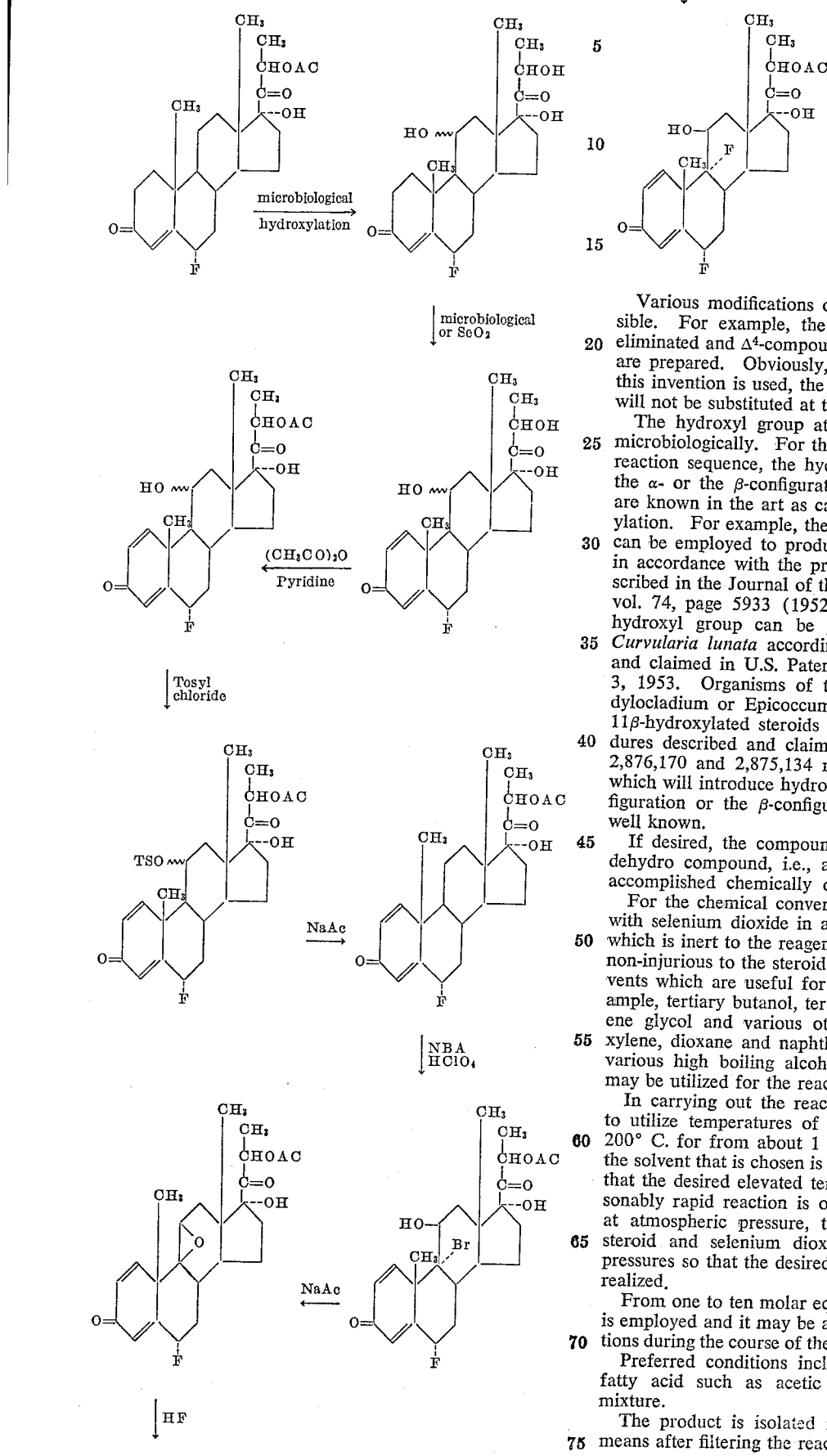

Various modifications of the above sequence are possible. For example, the dehydrogenation step can be eliminated and $\Delta^4$-compounds rather than $\Delta^{1,4}$-compounds are prepared. Obviously, if a 6-desfluoro compound of this invention is used, the resulting $\Delta^4$- or $\Delta^{1,4}$-compound will not be substituted at the 6-position.

The hydroxyl group at the 11-position is introduced microbiologically. For the purposes shown in the above reaction sequence, the hydroxyl group may be in either the α- or the β-configuration. A number of organisms are known in the art as capable of affecting this hydroxylation. For example, the organism, *Rhizopus nigricans*, can be employed to produce an 11α-hydroxy compound in accordance with the procedure of Peterson et al. described in the Journal of the American Chemical Society, vol. 74, page 5933 (1952). Compounds with an 11β-hydroxyl group can be prepared using, for example, *Curvularia lunata* according to the procedure described and claimed in U.S. Patent 2,658,023, issued November 3, 1953. Organisms of the genus Chaetomella, Spondylocladium or Epicoccum can also be used to prepare 11β-hydroxylated steroids in accordance with the procedures described and claimed in U.S. Patents 2,882,205, 2,876,170 and 2,875,134 respectively. Other organisms which will introduce hydroxyl groups in either the α-configuration or the β-configuration at the 11-position are well known.

If desired, the compound is next converted to a 1,2-dehydro compound, i.e., a $\Delta^1$-compound. This can be accomplished chemically or microbiologically.

For the chemical conversion, the compound is treated with selenium dioxide in an inert solvent, i.e., a solvent which is inert to the reagent selenium dioxide, as well as non-injurious to the steroid compound and product. Solvents which are useful for this reaction include, for example, tertiary butanol, tertiary pentanol, benzene, ethylene glycol and various other glycol ethers, phenetole, xylene, dioxane and naphthalene. It will be noted that various high boiling alcohols, ethers and hydrocarbons may be utilized for the reaction.

In carrying out the reaction, it is generally preferred to utilize temperatures of from about 75° C. to about 200° C. for from about 1 hour to about 100 hours. If the solvent that is chosen is not sufficiently high boiling so that the desired elevated temperature, which assures reasonably rapid reaction is obtained, on heating to reflux at atmospheric pressure, then the mixture of solvent, steroid and selenium dioxide is subjected to elevated pressures so that the desired elevated temperature can be realized.

From one to ten molar equivalents of selenium dioxide is employed and it may be added in several different portions during the course of the reaction.

Preferred conditions include the addition of a lower fatty acid such as acetic acid to a tertiary butanol mixture.

The product is isolated in accordance with standard means after filtering the reaction mixture to remove solid residual material. The mixture may be simply evaporated in vacuo to leave the desired product as a residue which is then purified by recrystallization or chromatography. Alternatively, the filtrate may be washed with various reagents designed to remove residual impurities before it is evaporated. This procedure is illustrated in the examples.

If a microbiological method is selected for introducing the double bond at the 1,2-position, a number of organisms are available. There may be mentioned by way of example, *Corynebacterium simplex* as described by Bernstein et al. in the Journal of the American Chemical Society, 78, 5693 (1956) and organisms of the genus Mycobacterium as described in U.S. Patent 2,905,592 issued on September 22, 1959. Particularly useful are organisms of the genus Nocardia including, for example, *Nocardia opaca* ATCC 4276 and *Nocardia globerula* ATCC 9356. The steroid is subjected to the oxidizing, that is, the dehydrogenating activity of the selected organism. There are several procedures which may be used for the dehydrogenation. In the first of these, nutrient media are seeded with slants of the selected organism. Such a medium may consist, for example, of a mixture of standard bacteriological nutrient broth base, together with added carbohydrate. The cultivation of the various organisms in accordance with this procedure has been described in considerable detail in many publications. The seeded, sterile, nutrient solutions may be grown in shake flasks for two to three days to provide inoculum for larger vessels and in turn, the larger, stirred, aerated vessels may be used for the inoculation of full production scale vessels for submerged fermentation. The same medium of the type described above may be used for the large scale dehydrogenation of steroids according to this process. Considerable variation may, of course, be made in the medium. In general, there is required a carbohydrate, a source of organic nitrogen, mineral salts and various trace metals.

Rather than conducting the dehydrogenation in the presence of the whole fermentation broth, the cells may be removed from growing cultures and these may be resuspended in a medium which is designated the enzyme reaction mixture. Such a mixture may consist, for example, of a solution which is 0.01 molar in sodium fumarate or other hydrogen acceptor or in magnesium sulfate and 0.03 molar in sodium citrate. The presence of a certain amount of adenosine triphosphate, for example, 0.125% is also quite useful. Centrifuged, washed cells of the chosen organism may be suspended in this type of reaction mixture which is adjusted to a pH of about 6, for example, with citric acid. After addition of the steroid compound which it is desired to oxidize, the mixture may be incubated at about 37° C. and samples may be removed from time to time to determine the point at which maximum conversion of the steroid has taken place. In general, this occurs after about one to several days. The cells from about 100 ml. of the stirred, aerated cultures may be suspended in about 20 ml. of an enzyme reaction mixture for suitable results. Considerable variation may be made in these proportions. The steroid compound may be used in a proportion of about 25 to about 200 mg./ml. of the enzyme reaction mixture. The compound in solid form is merely added to the medium after adjustment of the pH. The flasks are stoppered with cotton so that they are exposed to the air during the incubation. It is preferred to use a small volume compared to the volume of the flask, for example, 20 ml. in a 125 ml. Erlenmeyer flask. Alternatively, the mixture may be stirred and aerated. In general, a hydrogen acceptor, a divalent metal, particularly magnesium and a buffer are required in the medium.

Rather than removing the cells and carrying out the reaction in an enzyme reaction mixture, the steroid compound may be added directly to a sterilized portion of the nutrient medium such as is described above and the medium is then seeded with the chosen organism. Approximately, the same proportion of chosen steroid compound may be used in this case also. Samples of the agitated aerated mixture may be removed at intervals for determination of the conversion of the steroid compound to the oxidized products. The mixture is maintained at between 20° C. and 37° C. or higher during the growth of the cells and the conversion of the steroid. In general, about one-half to seven days are required for maximum production of the dehydrogenated compounds. Alternatively, the growth of cells may be established before the addition of the steroid.

A third method which is also very useful for the dehydrogenation of the substrate involves the use of oxidizing enzymes produced by the organism. These may be prepared by a variety of methods from the cells of the organism. These materials may be released from the cells by different procedures. These include grinding, particularly with abrasive materials such as powdered glass or sand which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° C. to about 50° C. The cells disintegrate within one to several days and the cell residue may be removed by filtration, for example, through a Seitz filter or through a sintered glass bacterial filter. A third method for preparing cell-free elaboration products of an organism used for dehydrogenation is by repeated, rapid freezing and thawing of the cellular material. Another method is by the use of ultrasonic energy to rupture the cells. One further method of use for the same purpose is by the use of a water miscible solvent, particularly acetone. The cells when placed in such a solvent are ruptured and an extract of the desired enzymes is obtained. The enzymes may be used for dehydrogenation in media similar to those used with the grown cells, that is, one containing a hydrogen acceptor such as fumarate, a buffer and in some cases, a bivalent metal, particularly, magnesium as well as a minor proportion of adenosine triphosphate. The cell-free oxidizing enzymes of the organism may be used in media indicated above at a temperature of about 20° C. to about 40° C. In general, the oxidation of the desired steroid compound is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks Manometric Techniques in Tissue Metabolism by W. W. Umbreit et al., Burgess Publishing Company, Minneapolis (1949) and Respiratory Enzymes by H. Lard, Burgess Publishing Company, Minneapolis (1949).

The use of this process in connection with dehydrogenations using organisms of the genus Nocardia is described in detail in copending patent application Serial No. 538,514 filed October 4, 1955, now abandoned.

The products may be isolated by known methods for example, by extraction with various water immiscible organic solvents. Lower halogenated hydrocarbons such as chloroform are particularly useful. After extraction, the solvent may be removed by distillation and the solid product then isolated. Further purification may be effected by recrystallization from suitable organic solvents, for example, ethyl acetate. Chromatographic methods employing paper, alumina or other suitable solid absorbent materials can also be used.

Reference is made above to the use of various 11-hydroxylating organisms in the course of this invention. The procedures set forth in detail for dehydrogenation are also useful for hydroxylating. For the reaction, the steroid compound is contacted with the oxygenating activity of the selected microorganism to introduce the hydroxyl group in accordance with one of the procedures set forth above.

The microbiological procedures described above generally hydrolyze the ester group at the 21-position, concurrently with the reaction by which they affect the desired result. The product should, therefore, be esterified before continuing with this sequence of reactions. Since the 21-position hydroxyl group is the only primary alcohol group present in the molecule, it may be readily esterified by standard methods, although Fisher esterification transesterification procedures may be employed. In general, it is preferred to form the esters by treatment with an acylating agent such as an acyl halide or anhydride in the presence of a tertiary base such as pyridine or dimethyl aniline. The procedure is illustrated in the appended examples.

The 21-ester prepared as described above is next dehydrated to form a $\Delta^{9(11)}$-compound. This is accomplished by first converting the steroid to an 11-sulfonyloxy compound, i.e., a sulfonate ester and subsequently removing a molecule of a sulfonic acid. The procedure is well known in the art and involves reaction with the appropriate sulfonyl halide. Suitable sulfonyl halides include both arylsulfonyl halides such as p-toluene-sulfonyl chloride or p-bromo-sulfonyl chloride and alkylsulfonyl halides such as methane or ethanesulfonyl chloride. The preferred reagents are p-toluene-sulfonyl chloride and methanesulfonyl chloride. The resulting esters are referred to respectively as to sylates or mesylates. In the preparation of $\Delta^{9(11)}$-steroids, the 11α-esters are generally isolated and the 11β-esters generally are not.

The sulfonate ester is prepared by reacting the steroid in a hydrocarbon or halogenated hydrocarbon solvent containing up to eight carbon atoms or pyridine with at least a molar equivalent and preferably with an excess of from about 10% to about 40% of the selected sulfonyl halide. The reaction takes place in the presence of an alkaline reagent, preferably a nitrogenous base. Sufficient base should be employed to neutralize all of the hydrogen halide by-product which forms, although excesses, even up to 1000% or more can be used.

Suitable solvents include, for example, benzene, chlorobenzene, toluene, carbon tetrachloride, chloroform, methylene chloride or ethylene chloride. Dimethyl aniline, N-methyl piperidine or pyridine are examples of nitrogenous bases which can be successfully used.

Pyridine is especially useful and is preferred for this reaction, since it can serve both as a solvent and as a base. Occasionally mixed solvent systems are used. Thus, the steroid will be taken up in pyridine and the acid chloride in chloroform. The latter is then added to the pyridine mixture.

The temperature of the reaction may vary from about 0° C. to about 40° C. The higher temperatures increase the rate of reaction. It is preferred to carry out the reaction at from about 25° C. to about 40° C. since this temperature range is consistent with a convenient rate of reaction and does not increase the cost of reaction by the necessity of destroying heat energy to attain the low temperature. The time of reaction varies from 8 to about 60 hours. In the preferred temperature range, the time of reaction will be from about 8 to about 10 hours.

The product is isolated using standard means well known in the art. The reaction mixture may, for example, be quenched in ice water and the desired product isolated by extracting the aqueous mixture with an organic solvent such as one of those mentioned above. Chloroform is especially useful. The organic layer is usually washed with dilute mineral acid to destroy any excess base and then with water. The product is isolated by evaporating the solvent in vacuo, preferably after drying over an anhydrous drying agent such as anhydrous sodium or magnesium sulfate.

Conversion of the ester to the $\Delta^{9(11)}$-compound is effected by heating the compound together with an alkaline reagent, preferably an alkali metal salt of a lower fatty acid in a substantially anhydrous liquid solvent. Operable salts include sodium acetate, potassium acetate, and sodium or potassium propionate or butyrate. A molar equivalent of alkaline reagent can be used, but it is preferred to use from about a 200 to a 700% molar excess. Suitable solvents include lower fatty acids containing up to four carbon atoms and N-alkyl or N,N-dialkyl amide derivatives of these fatty acids. They include, for example, formic acid, acetic acid, propionic acid, butyric acid, N-methyl formamide, N,N-dimethylformamide, N,N-diethylformamide or N-methyl acetamide. Other reagents capable of effecting the desired result include sodium iodide, potassium iodide or lithium bromide in acetone or a lower fatty acid.

The temperature range for the reaction is from about 30° C. to about 140° C. and the time of reaction is from about 10 minutes to about sixteen hours. The mesylate is more readily decomposed than the tosylate. In fact, it is possible to decompose the mesylate directly in the reaction mixture in which it is formed, but it is preferred in the 11α-series to isolate the intermediate and to initiate a new reaction in order to obtain a $\Delta^{9(11)}$-compound of high purity. Since the tosylate is more stable than the mesylate, it is preferred to form the tosylate and to isolate and decompose it.

The desired product may be isolated either by precipitation with water or by evaporating the solvent in vacuo and washing the residue with water. In a variation of the last procedure, the residue is taken up in an organic solvent such as chloroform; the solvent washed, dried and evaporated. Purification may be effected by recrystallization or trituration.

The $\Delta^{4,9(11)}$-21-acyloxy compound obtained from the previous reaction is next converted to a 9α-bromo-11β-hydroxy compound by reaction with hypobromous acid, preferably, generated in situ by treatment of N-bromoacetamide or N-bromosuccinimide with an aqueous solution of a strong acid such as sulfuric, p-toluenesulfonic, trichloroacetic or perchloric acid. The last mentioned of these is preferred. The reaction is preferably carried out in peroxide-free dioxane containing the selected hypobromous acid releasing agent and an aqueous acid. Preferably, an excess of hypobromous acid releasing agent of from about 10% to about 25% is employed, although greater or lesser amounts say from equimolar to about 50% excess can also be used. A mole to mole ratio of strong acid and hypobromous acid releasing agent is used. The resulting reaction is obviously between the steroid and from an equimolar to about a 50% excess of hypobromous acid. The temperature of the reaction is from about 20 to about 40° C. and the duration is from about 1 to about 4 hours.

The product may be isolated by admixing the reaction mixture with water and filtering the resulting precipitate. It is convenient to decompose excess perchloric acid by the addition of sodium sulfite or hyposulfite before precipitation with water. Purification may be accomplished by recrystallization from a suitable solvent such as acetone.

In a preferred embodiment, the $\Delta^{4,9(11)}$-compound is dissolved in peroxide-free dioxane and aqueous perchloric acid is added. Solid N-bromoacetamide is added and the mixture is kept in the dark at room temperature for one hour. The excess perchloric acid is destroyed by the addition of sodium sulfite and the product isolated as described above.

The 9α-bromo-compounds obtained by this reaction are described and claimed in copending patent application, Serial No. 3996, filed January 22, 1960.

The 9α-bromo-11β-hydroxy compound is next converted to a 9β,11β-epoxide. This is accomplished by reaction with sodium or potassium acetate. Other alkaline reagents such as sodium or potassium carbonate and bicarbonate may be used, but these are not preferred since the 21-ester group is hydrolyzed and must be re-esterified. The reaction may be effected in water, or preferably dioxane, or a lower alkanol solvent such as methanol or ethanol at a temperature of from about 20° C. to about 75° C. during a reaction period of from about one to about twenty hours. The higher temperatures favor shorter reaction periods. A solvent mixture can also be used. An equimolar quantity of alkaline reagent can be used, but it is preferred to use a molar excess of from about 10% to about 200%.

The product is recovered by standard means. If water is used, the reaction mixture is extracted with an organic solvent such as methylene chloride or chloroform. If an alkanol or a mixture of water and alkanol is used, the alkanol is removed in vacuo and the residue extracted or taken up in an organic solvent. The desired product is isolated from the organic solution by evaporation of the solvent in vacuo, preferably after drying over an anhydrous drying agent, such as sodium or magnesium sulfate.

Conversion of the epoxide to a 9α-fluoro-11β-hydroxyl compound is effected by the action of anhydrous hydrogen fluoride in the presence of an organic, proton acceptor such as a lower alkanol containing up to three carbon atoms, dioxane or tetrahydrofuran. The last mentioned of these reagents is preferred. Suitable solvents for carrying out the reaction include hydrocarbon and halogenated hydrocrabon solvents containing up to eight carbon atoms such as benzene, chlorobenzene, hexane, octane, carbon tetrachloride, methylene chloride, ethylene chloride and chloroform. The reaction is carried out at a temperature of from about −70° C. to about 30° C. With $\Delta^4$-compounds, lower temperatures within this range say from −70° C. to 0° C. are preferred. With $\Delta^{1,4}$-compounds, the preferred temperature range is from about −15° C. to about 25° C. The duration of the reaction is from about 4 to about 20 hours. An excess of hydrogen fluoride is used. The amount of the excess is not critical and may vary from 100% or less to as high as 800% or even more.

The product is isolated, for example, by admixture with dilute aqueous alkaline reagent such as aqueous sodium bicarbonate or potassium bicarbonate, containing enough base to neutralize the acid. Extraction of the mixture with an organic solvent such as chloroform followed by washing with water, drying over an anhydrous reagent such as sodium sulfate, filtration and removal of the solvent yields the desired product. The product may be further purified by recrystallization from a suitable solvent, such as ethyl acetate.

In a preferred method, a reaction mixture containing a molar ration of anhydrous hydrogen fluoride to tetrahydrofuran of from about 1.7:1 to about 4:1 is pre-cooled to the desired temperature and a pre-cooled steroid solution of steroid in chloroform is added. The mixture is allowed to stand at the selected temperature for about 4 hours and then isolated.

Reference is made above to the conversion of Compound IV to Compound V by oxidation. It may be desirable although it is not essential to carry out this conversion stepwise by first converting the 3-hydroxy-$\Delta^5$-compound to a 5α,6β-dibromo compound which is oxidized and then debrominated to form the desired Compound V. Thus, 21-methyl-$\Delta^5$-pregnene-3β,17α,21-triol-20-one 21-acetate is converted to 5α,6β-dibromo-21-methyl-pregnane-3β,17α,21-triol-20-one 21-acetate. This new compound is oxidized to the new compound, 5α,6β-dibromo-21-methyl-pregnane-17α,21-diol-3,20-dione 21-acetate which is then debrominated to the desired 21-methyl-$\Delta^4$-pregnene-17α,21-diol-3,20-dione 21-acetate.

The dibromo compound is formed by reacting at least a molar equivalent of bromine with the steroid substrate in a halogenated hydrocarbon solvent containing up to two carbon atoms such as methylene chloride, chloroform, or ethylene chloride for from about 20 minutes to about 60 minutes at a temperature of from about −5° C. to about 5° C. Oxidation is effected as described above. The bromine atoms are removed by reaction with zinc dust which should be used in excess preferably from about 100% to 200% excess. Reaction is effected in a lower alkanol solvent such as methanol or ethanol at a temperature of from about 35° C. to about 80° C. for a period of from about 1 to about 2 hours. The addition of a halogenated hydrocarbon solvent may aid in maintaining the steroid in solution but this is not necessary. The addition of a small amount of acetic acid followed by a short reflux period is often helpful in the solubilizing of some of the zinc salts. This is not essential, however. After the filtrate is removed, the solution which contains a 3-keto-$\Delta^5$-steroid is isomerized to form the desired 3-keto-$\Delta^4$-steroid by the addition of a mineral acid such as hydrochloric or sulfuric acid to a pH of from about 0.2 to 1.2. Isomerization takes place while the mixture stands at a temperature of from about 20 to about 30° C. for a period of from about 30 to about 60 minutes.

Although the foregoing description relates specifically to 21-acetates, it should be understood that the procedure is equally applicable to the preparation of the other 21-acylated compounds of this invention.

The following examples are given solely for the purpose of illustration only and are not to be construed as limitations of this invention, many apparent variations of which are possible without departing from the spirit or scope thereof.

EXAMPLE I

*5α,6β,21-Tribromo-21-Methyl-Pregnane-3β,17α-Diol-20-One*

A total of 5 grams of 21-methyl-$\Delta^5$-pregnene-3β,17α-diol-20-one was taken up in 200 ml. of chloroform and 2 molar equivalents of bromine in 100 ml. of carbon tetrachloride was added while maintaining the temperature at 0° C. The mixture was allowed to stand for 4 hours at this temperature. A slight vacuum was applied to remove the hydrogen bromide formed during the reaction. The solution was then washed three times with equal volumes of 5% sodium carbonate and finally with water. The organic layer was separated, dried over anhydrous magnesium sulfate, filtered and the desired product obtained by removing the solvent in vacuo.

EXAMPLE II

*5α,6β,21-Tribromo-21-Methyl-Pregnane-3β,17α-Diol-20-One*

A total of 5 grams of 21-methyl-$\Delta^5$-pregnene-3β,17α-diol-20-one was taken up in 200 ml. of acetic acid and 2 molar equivalents of bromine in 100 ml. of acetic acid was added while maintaining the tempertaure at 40° C. The mixture was allowed to stand for one-half hour at this tempertaure. The product was isolated as described above.

EXAMPLE III

*5α,6β,21-Tribromo-21-Methyl-Pregnane-3β,17α-Diol-20 One*

A total of 5 grams of 21-methoxy-$\Delta^5$-pregnene-3β,17α-diol-20-one was taken up in 200 ml. of chlorobenzene and 2 molar equivalents of bromine in 100 ml. of chlorobenzene was added while maintaining the temperature at 25° C. The mixture was allowed to stand for one-half hour at this temperature. The product was isolated as described above using 5% potassium carbonate as the alkaline reagent.

EXAMPLE IV

*21-Iodo-21-Methyl-$\Delta^5$-Pregnene-3β,17α-Diol-20-One*

A total of 5 grams of 5α,6β,21-tribromo-21-methyl-pregnene-3β,17α-diol-20-one was taken up in 200 ml. of acetone and 4 molar equivalents of sodium iodide was added while maintaining the temperature at 20° C. The mixture was allowed to stand for 30 hours and was then poured into water to precipitate the product. It was isolated by filtration, washed with water and air-dried.

EXAMPLE V

*21-Iodo-21-Methyl-Δ⁵-Pregnene-3β,17α-Diol-20-One*

A total of 5 grams of 5,6,21-tribromo-21-iodo-21-methyl-pregnane-3β,17α-diol-20-one was taken up in 200 ml. of methyl ethyl ketone and 7 molar equivalents of sodium iodide was added while maintaining the temperature at 40° C. The mixture was allowed to stand at this temperature for 15 hours and the product isolated as described in the previous example.

EXAMPLE VI

*21-Iodo-21-Methyl-Δ⁵-Pregnene-3β,17α-Diol-20-One*

A total of 5 grams of 5,6,21-tribromo-21-iodo-21-methyl-pregnane-3β,17α-diol-20-one was taken up in 200 ml. of methyl isopropyl ketone and 5 molar equivalents of sodium iodide was added while maintaining the temperature at 30° C. The mixture was allowed to stand for 20 hours at this temperature and the product isolated by removal of the solvent in vacuo. It was washed with water and air-dried.

EXAMPLE VII

*21-Methyl-Δ⁵-Pregnene-3β,17α,21-Triol-20-One 21-Acetate*

A mixture containing 10 grams of potassium bicarbonate and an equimolar portion of acetic acid in 1 liter of acetone was prepared. To this mixture, there was added 7.3 grams of 21-iodo-21-methyl-Δ⁵-pregnene-3β,17α-diol-20-one in 3.6 liters of acetone. The mixture was refluxed for 16 hours and concentrated to a volume of approximately 100 ml. in vacuo. To the concentrate, there was added 275 ml. of water and the resulting solution was extracted three times with 300 ml. portions of chloroform. The combined chloroform extracts were washed successively with one 200 ml. portion of water, one 200 ml. portion of aqueous sodium bicarbonate and finally with a 200 ml. portion of water. The organic layer was separated, dried over magnesium sulfate, filtered and the desired product obtained by removal of the solvent in vacuo.

This procedure was also used to prepare the formate, propionate, butyrate and valerate esters of this compound.

EXAMPLE VIII

*21-Methyl-Δ⁵-Pregnene-3β,17α,21-Triol-20-One 21-Acetate*

A mixture containing 10 grams of 21-iodo-21-methyl-Δ⁵-pregnene-3β,17α-diol-20-one in 200 ml. of dimethyl formamide was prepared and a 2000% molar excess of potassium acetate was added. The mixture was maintained at 100° C. for 4 hours and the solvent removed in vacuo. The residue was washed with water, filtered and dried to yield the desired product.

The formate, propionate, butyrate, isobutyrate and valerate were similarly prepared.

EXAMPLE IX

*21-Methyl-Δ⁵-Pregnene-3β,17α,21-Triol-20-One 21-Acetate*

A mixture containing 10 grams of 21-iodo-21-methyl-Δ⁵-pregnene-3β,17α-diol-20-one in 150 ml. of methyl isopropyl ketone was prepared and a 200% molar excess of sodium acetate was added. The mixture was maintained at 40° C. for 24 hours and the solvent removed in vacuo. The residue was washed with water, filtered and dried to yield the desired product.

The formate, propionate, butyrate, isobutyrate and valerate were similarly prepared.

EXAMPLE X

*5α-Bromo-6β-Fluoro-21-Methyl-Pregnane-3β,17α,21-Triol-20-One 21-Acetate*

Anhydrous hydrogen fluoride (168 grams) was collected directly from the cylinder in a polyethylene vessel and cooled to −70° C. It was cautiously added to dry tetrahydrofuran also cooled to −70° C. and contained in a polyethylene vessel. Considerable heat was evolved, the temperature rising to approximately 0° C. The mixture was re-cooled to −70° C. and then added with vigorous stirring to a suspension of finely powdered N-bromoacetamide (26.7 grams) and 21-methyl-Δ⁵-pregnene-3β,17α,21-triol-20-one 21-acetate in 430 ml. of methylene chloride at this temperature. After maintaining for one hour at between −50° C. and −70° C. the entire reaction mixture was poured cautiously into 3 liters of water containing 800 grams of potassium carbonate, the mixture being stirred during the addition. The organic layer was separated and the aqueous layer extracted with two 100 ml. portions of methylene chloride. The combined organic layers were washed with 5% potassium bicarbonate solution until neutral, then with water and finally dried over anhydrous sodium sulfate. The solvent was removed in vacuo to leave the desired product as a residue.

EXAMPLE XI

*5α-Bromo-6β-Fluoro-21-Methyl-Pregnane-3β,17α,21-Triol-20-One 21-Acetate*

A total of 0.5 mole of 21-methyl-Δ⁵-pregnene-3β,17α,21-triol-20-one 21-acetate in 300 ml. of methylene chloride was cooled to −80° C. To this mixture, there was added 0.52 mole of N-bromoacetamide and 12.5 moles of anhydrous hydrogen fluoride in 300 ml. of a tetrahydrofuran-methylene chloride solvent mixture containing 120 ml. of tetrahydrofuran. The solvent system of the final reaction mixture contained 20% tetrahydrofuran. The mixture was maintained at −80° C. for 16 hours and the product isolated as described in Example X.

EXAMPLE XII

*5α-Bromo-6β-Fluoro-21-Methyl-Pregnane-3β,17α,21-Triol-20-One 21-Acetate*

A total of 0.5 mole of 21-methyl-Δ⁵-pregnene-3β,17α,21-triol-20-one 21-acetate was taken up in 300 ml. of methylene chloride at −50° C. To this mixture, there was added 0.75 mole of N-bromoacetamide and 50 moles of hydrogen fluoride in 300 ml. of a tetrahydrofuran-methylene chloride solvent mixture containing 240 ml. of tetrahydrofuran. The solvent system of the final reaction mixture contained 40% tetrahydrofuran. The mixture was maintained at −50° C. for 1 hour and the product isolated as described in Example X.

EXAMPLE XIII

*5α-Bromo-6β-Fluoro-21-Methyl-Pregnane-3β,17α,21-Triol-20-One 21-Acetate*

A total of 0.5 mole of 21-methyl-Δ⁵-pregnene-3β,17α,21-triol-20-one 21-acetate in 300 ml. of chloroform was cooled to −80° C. To this mixture, there was added 0.52 mole of N-bromoacetamide and 12.5 moles of anhydrous hydrogen fluoride in 300 ml. of a dioxane-chloroform solvent mixture containing 120 ml. of dioxane. The solvent system of the final reaction mixture contained 20% dioxane. The mixture was maintained at −80° C. for 16 hours and the product isolated as described in Example X.

EXAMPLE XIV

*21-Methyl-Δ⁴-Pregnene-17α,21-Diol-3,20-Dione 21-Acetate*

A total of 20 grams of 21-methyl-Δ⁵-pregnene-3β,17α,21-triol-20-one 21-acetate in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the 3-keto-Δ⁵-compound. The ketone was collected by filtration, washed with water and air-dried. The product was taken up in acetic acid containing 2% by volume of sulfuric acid and the mixture was maintained at approximately 25 to 30° C. for 5 hours. This treatment effected the isomerization of the double bond at the 5-position to produce the desired 3-keto-Δ⁴-compound which was precipitated by the addiiton of water and collected by filtration.

EXAMPLE XV

*21-Methyl-Δ⁴-Pregnene-17α,21-Diol-3,20-Dione 21-Acetate*

A total of 4 grams of 21-methyl-Δ⁵-pregnene-3β,17α,21-triol-20-one 21-acetate in 300 ml. of acetone at 10° C. was treated with 5 ml. of 8 N chromic acid reagent added in one portion with vigorous stirring. After 5 minutes, the reaction temperature rose to approximately 20° C. and the entire mixture was poured into 2 liters of water which caused precipitation of the 3-keto-Δ⁵-compound. This compound was converted to the desired 3-keto-Δ⁴-compound as described in the previous example.

EXAMPLE XVI

*5α-Bromo-6β-Fluoro-21-Methyl-Pregnane-17α,21-Diol-3,20-Dione 21-Acetate*

To a solution of 5 grams of 5α-bromo-6β-fluoro-21-methyl-pregnane-3β,17α,21-triol-20-one 21-acetate in 25 ml. of glacial acetic acid, there was added 15 ml. of a solution of chromium trioxide in a 9:1 acetic acid-water solution containing 76 mgs. of chromium trioxide per ml. of solution. The mixture was kept at room temperature during the addition and for an additional 4 hours. The desired product was precipitated by the addition of water and collected by filtration.

EXAMPLE XVII

*5α-Bromo-6β-Fluoro-21-Methyl-Pregnane-17α,21-Diol-3,20-Dione*

A total of 20 grams of 5α-bromo-6β-fluoro-21-methyl-pregnane-3β,17α,21-triol-20-one 21-acetate in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the ketone. The ketone was collected by filtration, washed with water and air-dried. An additional portion of the desired product was isolated by extracting the aqueous filtrate with chloroform, drying the organic layer over anhydrous sodium sulfate, filtering and evaporating the solvent in vacuo.

EXAMPLE XVIII

*5α-Bromo-6β-Fluoro-21-Methyl-Pregnane-17α,21-Diol-3,20-Dione 21-Acetate*

Chromic anhydride (0.125 gram) was added to 15 ml. of pyridine at approximately 5° C. and the mixture allowed to warm spontaneously to room temperature. To this solution there was added 2.5 grams of 5α-bromo-6β-fluoro-21-methyl-pregnane-3β,17α,21-triol-20-one 21-acetate in 20 ml. of pyridine and the mixture was allowed to stand at room temperature for 24 hours. The solution was extracted with ether and the ether solution washed twice with 5% aqueous hydrochloric acid and then with water. The ether layer was dried over anhydrous sodium sulfate, filtered and the desired product obtained by removal of the ether in vacuo.

This same procedure was used to prepare the formate, propionate, butyrate, isobutyrate and valerate esters of this compound.

EXAMPLE XIX

*5α-Bromo-6β-Fluoro-21-Methyl-Pregnane-17α,21-Diol-3,20-Dione 21-Acetate*

A solution of 0.5 gram of sodium dichromate dihydrate in 10 ml. of glacial acetic acid was added over a 30-minute period to 0.25 gram of 5α-bromo-6β-fluoro-21-methyl-pregnane-3β,17α,21-triol-20-one 21-acetate in 50 ml. of 1:1 glacial acetic acid-benzene at 10° C. After 1 hour, an additional 0.3 gram of oxidizing agent in 7 ml. of solvent was added and the mixture left standing for 24 hours at 10° C. It was poured into cold aqueous sodium bisulfite solution and the solution extracted with ether. The organic layer was washed with water until the washings were neutral, dried over anhydrous sodium sulfate, filtered and the ether removed in vacuo to isolate the desired product.

EXAMPLE XX

*6β-Fluoro-21-Methyl-Δ⁴-Pregnene-17α,21-Diol-3,20-Dione 21-Acetate*

A mixture containing 5 grams of 5α-bromo-6β-fluoro-21-methyl-pregnane-17α,21-diol-3,20-dione 21-acetate and an equimolar portion of anhydrous sodium acetate was refluxed in 200 ml. of methanol for 40 minutes. The mixture was then poured into 800 ml. of water to precipitate the desired product which was collected by filtration.

This same procedure was used to prepare the formate, propionate, butyrate, isobutyrate and valerate esters of this compound.

EXAMPLE XXI

*6α-Fluoro-21-Methyl-Δ⁴-Pregnene-17α,21-Diol-3,20-Dione 21-Acetate*

A mixture containing 5 grams of 5α-bromo-6β-fluoro-21-methyl-pregnane-17α,21-diol-3,20-dione 21-acetate together with a 200% molar excess of sodium propionate in 150 ml. of ethyl acetate was refluxed for 4 hours. The solvent was then removed by distillation in vacuo and the residue washed with water to leave the desired product.

EXAMPLE XXII

*6β-Fluoro-21-Methyl-Δ⁴-Pregnene-17α,21-Diol-3,20-Dione 21-Acetate*

A mixture containing 5 grams of 5α-bromo-6β-fluoro-21-methyl-pregnane-17α,21-diol-3,20-dione 21-acetate and a 100% molar excess of potassium acetate in 150 ml. of di-n-butyl ketone was maintained at 130° C. for one-half hour. The solvent was removed in vacuo and the residue washed with water to leave the desired product.

EXAMPLE XXIII

*6β-Fluoro-21-Methyl-Δ⁴-Pregnene-17α,21-Diol-3,20-Dione 21-Acetate*

A mixture containing 5 grams of 5α-bromo-6β-fluoro-21-methyl-pregnane-17α,21-diol-3,20-dione 21-acetate together with a 100% molar excess of sodium carbonate in 150 ml. of acetone was refluxed for 2 hours. The mixture was then poured into 8 liters of water to precipitate the desired product which was isolated by filtration.

EXAMPLE XXIV

*6β-Fluoro-21-Methyl-Δ⁴-Pregnene-17α,21-Diol-3,20-Dione 21-Acetate*

A mixture containing 5 grams of 5α-bromine-6β-fluoro-21-methyl-pregnane-17α,21-diol-3,20-dione 21-acetate together with a 40% molar excess of sodium carbonate was maintained at 50° C. in 150 ml. of ethanol for 4 hours. The mixture was then poured into 8 liters of water to precipitate the desired product which was isolated by filtration.

EXAMPLE XXV

*6α-Fluoro-21-Methyl-Δ⁴-Pregnene-17α,21-Diol-3,20-Dione 21-Acetate*

A stream of anhydrous hydrogen chloride was bubbled for about 3 hours into a solution of 10 grams of 6β-fluoro-21-methyl-Δ⁴-pregnene-17α,21-diol-3,20-dione 21-acetate in 850 ml. of chloroform and 7 ml. of absolute ethanol. The temperature was maintained at −5° C. during the addition. At the end of this period, the solution was diluted with 1500 ml. of chloroform and washed successively with sodium carbonate and water. It was dried over anhydrous sodium sulfate, filtered and the desired product obtained by removal of the solvent in vacuo.

This same procedure was used to prepare the propionate, formate, butyrate and valerate esters of this compound.

EXAMPLE XXVI

*6α-Fluoro-21-Methyl-Δ⁴-Pregnene-17α,21-Diol-3,20-Dione 21-Acetate*

A total of 1 gram of 6β-fluoro-21-methyl-Δ⁴-pregnene-17α,21-diol-3,20-dione 21-acetate in 100 ml. of methylene chloride was treated with dry hydrogen bromide at 10° C. for 2½ hours. The solution was washed with water, dilute sodium carbonate and again with water. The organic layer was dried over anhydrous magnesium sulfate and the desired product obtained by removing the solvent in vacuo.

EXAMPLE XXVII

*6α-Fluoro-21-Methyl-Δ⁴-Pregnene-17α,21-Diol-3,20-Dione 21-Acetate*

A total of 10 grams of 6β-fluoro-21-methyl-Δ⁴-pregnene-17α,21-diol-3,20-dione 21-acetate was taken up in 1500 ml. of chloroform containing 100 ml. of sulfuric acid. The reaction mixture was maintained at −5° C. for 4 hours. The mixture was cautiously added to 2 liters of water containing 500 grams of crushed ice. External cooling was necessary to maintain the temperature below 15° C. The resulting mixture was extracted with ethylene chloride. The organic layer was washed with water and then with sodium bicarbonate until neutral. It was washed again with water, dried over anhydrous magnesium sulfate, filtered and the desired product was recovered by removal of the solvent in vacuo.

EXAMPLE XXVIII

*6α-Fluoro-21-Methyl-Δ⁴-Pregnene-17α,21-Diol-3,20-Dione 21-Acetate*

A total of 25 grams of 6β-fluoro-21-methyl-Δ⁴-pregnene-17α,21-diol-3,20-dione 21-acetate was taken up in 1500 ml. of ethylene chloride containing 150 ml. of propanol. The solution was cooled to −10° C. and anhydrous hydrogen chloride was bubbled into the mixture for 2 hours. The mixture was washed with water and then with dilute sodium bicarbonate until neutral. It was washed again with water, the organic layer separated, dried over anhydrous sodium sulfate, filtered and the desired product recovered by removal of the solvent in vacuo.

EXAMPLE XXIX

*6α-Fluoro-21-Methyl-Δ⁴-Pregnene-17α,21-Diol-3,20-Dione 21-Acetate*

A total of 10 grams of 6β-fluoro-21-methyl-Δ⁴-pregnene-17α,21-diol-3,20-dione 21-acetate was taken up in 800 ml. of ethanol and cooled to −5° C. Anhydrous hydrogen chloride was bubbled through the mixture for 4 hours at this temperature. The solvent was removed in vacuo and the residue taken up in chloroform. The chloroform solution was washed with water, dilute sodium bicarbonate and again with water. It was dried over anhydrous magnesium sulfate, filtered and the desired product recovered by removal of the solvent in vacuo.

EXAMPLE XXX

*5α,6β-Dibromo-21-Methyl-Pregnane-3β,17α,21-Triol-20-One 21-Acetate*

A solution containing 5 grams of 21-methyl-Δ⁵-pregnene-3β,17α,21-triol-20-one 21-acetate in 100 ml. of methylene chloride was treated with an equimolar portion of bromine in an additional 100 ml. of methylene chloride at 2° C. and maintained at this temperature for 30 minutes. At the end of this period, the solution was washed with 2% aqueous sodium carbonate solution and then with water. The organic layer was dried over anhydrous sodium sulfate, filtered and the desired product obtained by removal of the solvent in vacuo.

This same procedure was used to prepare the formate, propionate, butyrate, isobutyrate and valerate esters of this compound.

EXAMPLE XXXI

*5α,6β-Dibromo-21-Methyl-Pregnane-17α,21-Diol-3,20-Dione 21-Acetate*

To a solution of 5 grams of the compound prepared in the previous example in 25 ml. of glacial acetic acid, there was added 15 ml. of a solution of chromium trioxide in a 9:1 acetic acid-water solution containing 76 mg. of chromium trioxide per ml. of solution. The mixture was kept at room temperature during the addition and for an additional 4 hours. The desired product was precipitated by the addition of water and collected by filtration.

This same procedure was used to prepare the formate, propionate, butyrate, isobutyrate and valerate esters of this compound.

EXAMPLE XXXII

*21-Methyl-Δ⁴-Pregnene-17α,21-Diol-3,20-Dione 21-Acetate*

A mixture containing 5 grams of the compound prepared in the previous example together with a 100% excess of zinc dust in 100 ml. of a 1:1 mixture of methylene chloride and methanol was refluxed for 1 hour. At the end of this period, 5 ml. of acetic acid was added and the mixture refluxed for an additional 45 minutes. The mixture was filtered, cooled and adjusted to a pH of 0.2 with hydrochloric acid. It was maintained at 25 to 30° C. for 45 minutes and an equal portion of water was added. The organic layer was separated, dried over anhydrous sodium sulfate, filtered and the solvent removed to yield the desired product.

What is claimed is:

1. A process which comprises reacting a compound having the formula:

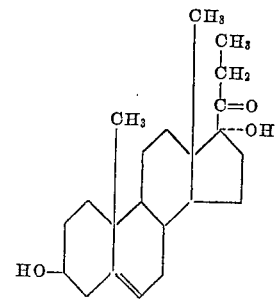

with from at least 2 to about 2½ molar equivalents of bromine at a temperature of from about 0° C. to about 40° C. for a period of from about one-half to about 4 hours in a solvent selected from the group consisting of hydrocarbon and halogenated hydrocarbon solvents containing up to seven carbon atoms acetic acid and mixtures of these to produce a compound having the formula:

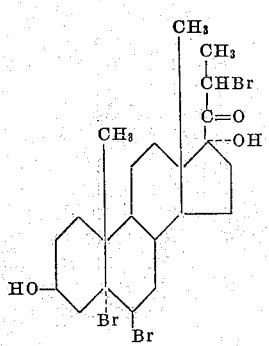

reacting said compound with from about 4 to about 7 molar equivalents of sodium iodide in an aliphatic ketone solvent containing up to five carbon atoms at a temperature of from about 20° C. to about 30° C. for a period of from about 15 to about 30 hours to produce a compound having the formula:

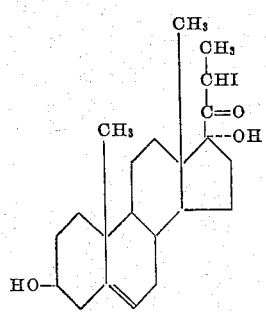

reacting said compound with from about a 200% molar excess to about a 2000% molar excess of a reagent selected from the group consisting of sodium and potassium salts of fatty acids containing up to five carbon atoms in a solvent selected from the group consisting of dimethyl formamide and aliphatic esters and ketones containing up to five carbon atoms at a temperature of from about 40° C. to about 100° C. for a period of from about 4 to about 24 hours to produce a compound having the formula:

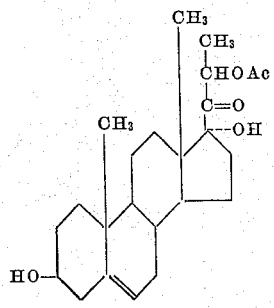

wherein Ac is an acyl hydrocarbon group containing only carbon, hydrogen and oxygen up to a total of five carbon atoms; reacting said compound with from about 1.05 to about 1.15 molar equivalents of N-bromoacetamide and from about 25 to about 100 molar equivalents of anhydrous hydrogen fluoride in a solvent system consisting of tetrahydrofuran and methylene chloride containing from about 20% to about 40% tetrahydrofuran by volume at a temperature of from about −80° C. to about −50° C. for a period of from about 1 to about 16 hours to produce a compound having the formula:

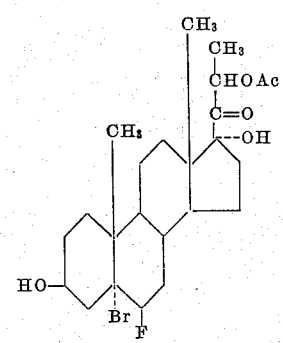

wherein Ac has the same meaning as above; oxidizing said compound to produce a compound having the formula:

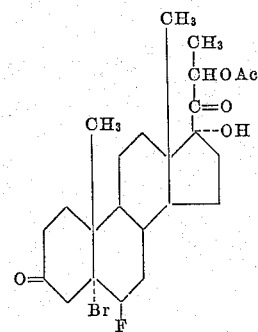

wherein Ac has the same meaning as above; reacting said compound with from about a molar equivalent to about a 200% molar excess of an alkaline reagent in a solvent selected from the group consisting of alkanols, esters and ketones containing up to nine carbon atoms at a temperature of from about 50° C. to about 130° C. for a period of from about one-half to about 1 hour to produce a compound having the formula:

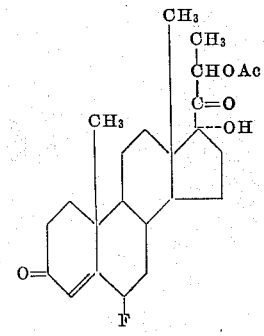

wherein Ac has the same meaning as above; reacting said compound with a reagent selected from the group consisting of anhydrous hydrogen bromide in a solvent selected from the group consisting of halogenated hydrocarbons containing up to two carbon atoms and aliphatic esters and alkanols containing up to three carbon atoms and mixtures of these at a temperature of from about −5° C. to about 10° C. for a period of from about 2 to about 4 hours to produce a compound having the formula:

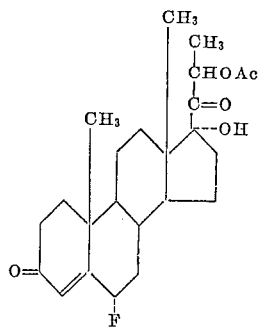

wherein Ac has the same meaning as above.

2. 5α,6β,21 - tribromo - 21 - methyl - pregnane-3β,17α-diol-20-one.

3. 21-iodo-21-methyl-Δ5-pregnene-3β,17α-diol-20-one.

4. 21-methyl-Δ5-pregnene-3β,17α,21-triol-20-one 21-esters wherein the acyl group is an acyl hydrocarbon group containing only carbon, hydrogen and oxygen up to a total of five carbon atoms.

5. 5α - bromo - 6β - fluoro-21-methyl-pregnane-3β,17α-21-triol-20-one 21-esters wherein the acyl group is an acyl hydrocarbon group containing only carbon, hydrogen and oxygen up to a total of five carbon atoms.

6. 5α - bromo - 6β - fluoro-21-methyl-pregnane-17α,21-diol-3,20-dione 21-esters wherein the acyl group is an acyl hydrocarbon group containing only carbon, hydrogen and oxygen up to a total of five carbon atoms.

7. 5α,6β - dibromo-21-methyl-pregnane-3β,17α,21-triol-20-one 21-esters wherein the acyl group is an acyl hydrocarbon group containing only carbon, hydrogen and oxygen up to a total of five carbon atoms.

8. 5α,6β - dibromo - 21 - methyl-pregnane-17α,21-diol-3,20-dione 21-esters wherein the acyl group is an acyl hydrocarbon group containing only carbon, hydrogen and oxygen up to a total of five carbon atoms.

References Cited in the file of this patent

UNITED STATES PATENTS

| | | |
|---|---|---|
| 2,786,856 | Cutler et al. | Mar. 26, 1957 |
| 2,802,839 | Ringold et al. | Aug. 13, 1957 |
| 2,934,546 | Ringold et al. | Apr. 26, 1960 |